US012389262B2

(12) United States Patent
Kassir et al.

(10) Patent No.: US 12,389,262 B2
(45) Date of Patent: Aug. 12, 2025

(54) UPLINK PACKET MANAGEMENT FOR USER INTERACTION DELAY REDUCTION

(71) Applicant: QUALCOMM Incorporated, San Diego, CA (US)

(72) Inventors: Saadallah Kassir, San Diego, CA (US); Yih-Hao Lin, San Diego, CA (US); Mickael Mondet, Louannec (FR)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 18/324,063

(22) Filed: May 25, 2023

(65) Prior Publication Data

US 2024/0397370 A1 Nov. 28, 2024

(51) Int. Cl.
*H04W 28/02* (2009.01)
*H04L 47/2416* (2022.01)
*H04L 47/2483* (2022.01)

(52) U.S. Cl.
CPC ..... *H04W 28/0236* (2013.01); *H04L 47/2416* (2013.01); *H04L 47/2483* (2013.01); *H04W 28/0252* (2013.01)

(58) Field of Classification Search
CPC .......... H04W 28/0236; H04W 28/0252; H04L 47/2416; H04L 47/2483
See application file for complete search history.

(56) References Cited

U.S. PATENT DOCUMENTS

2019/0059023 A1* 2/2019 Forsman ............. H04L 47/2483
2019/0075486 A1* 3/2019 Welin ................ H04L 47/30

FOREIGN PATENT DOCUMENTS

WO WO-2017146621 A1 8/2017

OTHER PUBLICATIONS

International Search Report and Written Opinion—PCT/US2024/029764—ISA/EPO—Sep. 24, 2024.

* cited by examiner

*Primary Examiner* — Joe Chacko
(74) *Attorney, Agent, or Firm* — Holland & Hart LLP

(57) ABSTRACT

Methods, systems, and devices for wireless communications are described. For instance, a flow control layer of a UE may provide a capability message to an application layer including an indication that the UE supports a service for providing flow control information for support of extended reality traffic and may receive a message from an application of the application layer registering a flow associated with the application with the service. The flow control layer may provide, to the application via the service, an indication that a quantity of packets or bytes in a buffer of the flow control layer fails to satisfy a threshold. The UE may obtain, from the application, a packet associated with the flow based on providing the indication that the quantity of packets or bytes in the buffer fails to satisfy the threshold and may transmit, to a network entity, a message including the obtained packet.

30 Claims, 10 Drawing Sheets

UPLINK PACKET MANAGEMENT FOR USER INTERACTION DELAY REDUCTION

FIELD OF TECHNOLOGY

The following relates to wireless communications, including uplink packet management for user interaction delay reduction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a UE may communicate with a network entity. For instance, the UE may transmit a packet to the network entity. In some examples, a latency may exist between when the UE determines to transmit a packet and when a server associated with the network entity receives the packet. Techniques to reduce this latency may improve the user experience.

SUMMARY

The described techniques relate to improved methods, systems, devices, and apparatuses that support uplink packet management for user interaction delay reduction. The described techniques may provide for a wireless device to reduce an average latency associated with providing a packet to a network entity. For instance, a UE may provide, from a flow control layer of the UE to an application layer, a capability message including an indication that the UE supports a service for providing flow control information from the flow control layer to the application layer for support of extended reality traffic. The UE may receive, from an application of the application layer, a first message registering a flow associated with the application with the service for providing the flow control information. The UE may provide, from the flow control layer to the application via the service, an indication that a quantity of packets or bytes in a buffer of the flow control layer associated with the flow fails to satisfy a threshold based on receiving the first message registering the flow with the service. The UE may obtain, from the application, a packet associated with the flow based on providing the indication that the quantity of packets or bytes in the buffer fails to satisfy the threshold and may transmit, to a network entity, over a wireless channel, a second message including the obtained packet.

A method for wireless communications at a user equipment (UE) is described. The method may include providing, from a flow control layer of the UE to an application layer, a capability message including an indication that the UE supports a service for providing flow control information from the flow control layer to the application layer for support of extended reality traffic, receiving, from an application of the application layer, a first message registering a flow associated with the application with the service for providing the flow control information, providing, from the flow control layer to the application via the service, an indication that a quantity of packets or bytes in a buffer of the flow control layer associated with the flow fails to satisfy a threshold based on receiving the first message registering the flow with the service, obtaining, from the application, a packet associated with the flow based on providing the indication that the quantity of packets or bytes in the buffer fails to satisfy the threshold, and transmitting, to a network entity over a wireless channel, a second message including the obtained packet.

An apparatus for wireless communications at a UE is described. The apparatus may include a processor, memory coupled with the processor, and instructions stored in the memory. The instructions may be executable by the processor to cause the apparatus to provide, from a flow control layer of the UE to an application layer, a capability message including an indication that the UE supports a service for providing flow control information from the flow control layer to the application layer for support of extended reality traffic, receive, from an application of the application layer, a first message registering a flow associated with the application with the service for providing the flow control information, provide, from the flow control layer to the application via the service, an indication that a quantity of packets or bytes in a buffer of the flow control layer associated with the flow fails to satisfy a threshold based on receiving the first message registering the flow with the service, obtain, from the application, a packet associated with the flow based on providing the indication that the quantity of packets or bytes in the buffer fails to satisfy the threshold, and transmit, to a network entity over a wireless channel, a second message including the obtained packet.

Another apparatus for wireless communications at a UE is described. The apparatus may include means for providing, from a flow control layer of the UE to an application layer, a capability message including an indication that the UE supports a service for providing flow control information from the flow control layer to the application layer for support of extended reality traffic, means for receiving, from an application of the application layer, a first message registering a flow associated with the application with the service for providing the flow control information, means for providing, from the flow control layer to the application via the service, an indication that a quantity of packets or bytes in a buffer of the flow control layer associated with the flow fails to satisfy a threshold based on receiving the first message registering the flow with the service, means for obtaining, from the application, a packet associated with the flow based on providing the indication that the quantity of packets or bytes in the buffer fails to satisfy the threshold, and means for transmitting, to a network entity over a wireless channel, a second message including the obtained packet.

A non-transitory computer-readable medium storing code for wireless communications at a UE is described. The code may include instructions executable by a processor to provide, from a flow control layer of the UE to an application layer, a capability message including an indication that the UE supports a service for providing flow control information from the flow control layer to the application layer for support of extended reality traffic, receive, from an application of the application layer, a first message registering a flow associated with the application with the service for providing the flow control information, provide, from the flow control layer to the application via the service, an indication that a quantity of packets or bytes in a buffer of the flow control layer associated with the flow fails to satisfy a threshold based on receiving the first message registering the flow with the service, obtain, from the application, a packet associated with the flow based on providing the indication that the quantity of packets or bytes in the buffer fails to satisfy the threshold, and transmit, to a network entity over a wireless channel, a second message including the obtained packet.

Some examples of the method, apparatuses, and non-transitory computer-readable medium described herein may further include operations, features, means, or instructions for providing the indication that the quantity of packets or bytes in the buffer fails to satisfy the threshold includes an indication to adjust an update rate for generating packets associated with the application layer and the packet may be obtained from the application layer based on providing the indication to adjust the update rate for generating packets.

In some examples of the method, apparatuses, and non-transitory computer-readable medium described herein, the indication to adjust the update rate includes an indication to adjust the update rate to a first value and the method, apparatuses, and non-transitory computer-readable medium may include further operations, features, means, or instructions for providing, from the flow control layer to the application via the service, an indication that the quantity of packets or bytes in the buffer of the flow control layer associated with the flow satisfies a second threshold, where the indication that the quantity of packets or bytes in the buffer satisfies the second threshold includes an indication to adjust the update rate to a second value.

In some examples of the method, apparatuses, and non-transitory computer-readable medium described herein, the quantity of packets or bytes failing to satisfy the threshold includes a first value of the quantity of packets or bytes being greater than the threshold and the quantity of packets or bytes satisfying the second threshold includes a second value of the quantity of packets or bytes being less than or equal to the second threshold.

Some examples of the method, apparatuses, and non-transitory computer-readable medium described herein may further include operations, features, means, or instructions for providing, from the flow control layer to the application layer using the service based on the quantity of the packets in the buffer failing to satisfy the threshold, an indication to suspend generating packets.

Some examples of the method, apparatuses, and non-transitory computer-readable medium described herein may further include operations, features, means, or instructions for providing, from the flow control layer to the application layer using the service, an indication to resume generating packets, where the indication to resume generating packets includes an indication that a second value of the quantity of packets or bytes satisfies a second threshold.

In some examples of the method, apparatuses, and non-transitory computer-readable medium described herein, the indication to suspend generating packets includes an indication that a configured grant (CG) for the UE may be deactivated.

In some examples of the method, apparatuses, and non-transitory computer-readable medium described herein, the indication to resume generating packets includes an indication that the CG may be reactivated.

In some examples of the method, apparatuses, and non-transitory computer-readable medium described herein, the flow control layer includes a radio link control (RLC) layer or a packet data convergence protocol (PDCP) layer.

DETAILED DESCRIPTION

Figure 1:
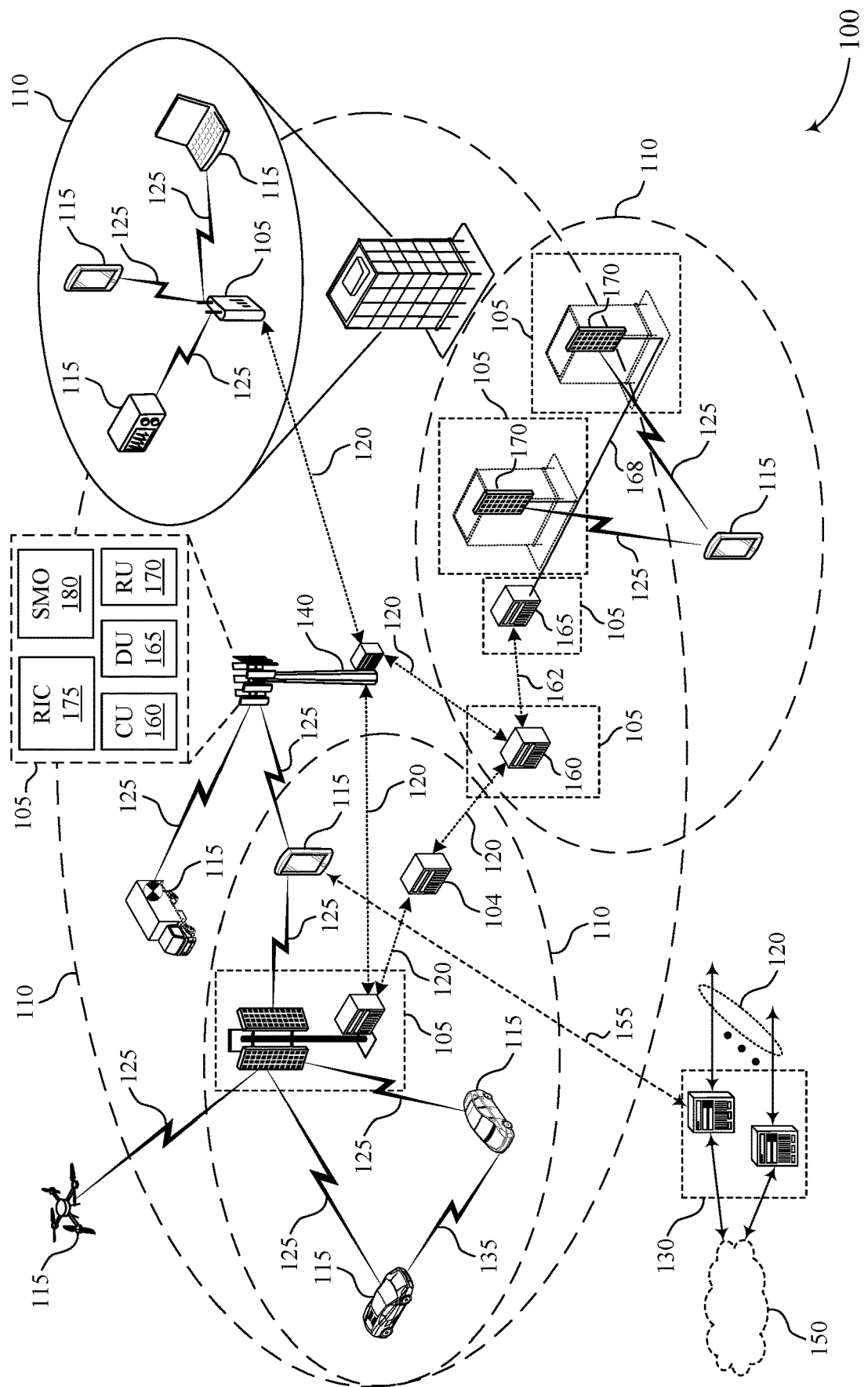
FIG. 1 shows an example of a wireless communications system that supports uplink packet management for user interaction delay reduction in accordance with one or more aspects of the present disclosure.

In some examples, a user equipment (UE) may communicate with a network entity. In certain applications (e.g., Extended Reality (XR) applications), a user interaction delay (UID) may be present when the UE communicates with the network entity, where the UID may be defined as a time when the user performs an action that results in the generation of an uplink packet at the UE and when a server in communication with the network entity sets a state upon reception of the packet from the network entity. This duration may include a queuing delay associated with a radio link control (RLC) or packet data convergence protocol (PDCP) buffer queue (e.g., a first-in first-out (FIFO) buffer), where the buffer queue may be configured to store a packet from a first time after the packet is generated to a second time when a transmission opportunity occurs over which the packet may be transmitted. As the buffer grows, the amount of time for a new packet added to the buffer to be transmitted may increase. Thus, the UID may also increase, which may degrade the user experience.

One technique to mitigate the increased latency associated with an increased buffer size may be for the UE to decrease a rate at which the UE generates packets when the buffer grows above a threshold amount (e.g., when a quantity of packets or bytes in the buffer exceeds the threshold amount). For instance, when the buffer grows above the threshold amount, a flow control layer (e.g., PDCP, RLC) may provide, to an application layer of the UE, an indication to decrease the rate at which packets are generated. Additionally, when the buffer shrinks below the threshold amount or some second threshold amount (e.g., when the quantity of packets or bytes in the buffer is below the threshold amount or the second threshold amount), the UE may increase a rate at which the UE generates packets. Increasing the rate in such circumstances may enable improved performance (e.g., packet generation may be more responsive to user action). In some examples, a flow control layer may provide the indication to update the rate to the application layer via a cross-layer application programming interface (API).

Another technique to mitigate the increased latency associated with the increase buffer size may be for the flow control layer of the UE to indicate, to the application layer, a buffer size, which may enable the UE to notify an application of the application layer to stop generating new packets when configured grant (CG) resources are deactivated and/or when the buffer grows above the threshold amount. Additionally, when CGs are reactivated and/or when the buffer shrinks below the threshold amount or below the second threshold amount, the UE may indicate, to the application, to resume generating new packets using the indicated buffer size.

Aspects of the disclosure are initially described in the context of wireless communications systems. Additional aspects of the disclosure are described in the context of decision flows and a process flow. Aspects of the disclosure are further illustrated by and described with reference to apparatus diagrams, system diagrams, and flowcharts that relate to uplink packet management for user interaction delay reduction.

FIG. 1 shows an example of a wireless communications system 100 that supports uplink packet management for user interaction delay reduction in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support uplink packet management for user interaction delay reduction as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In certain applications (e.g., XR applications), a UID may be present when the UE 115 communicates with the network entity 105, where the UID may be defined as a time difference between when the user performs an action that results in the generation of an uplink packet at the UE 115 and when a server in communication with the network entity 105 sets a state upon reception of the packet from the network entity 105. This duration may include a queuing delay associated with a RLC or PDCP buffer queue (e.g., a FIFO buffer), where the buffer queue may be configured to store a packet from a first time after the packet is generated to a second time when a transmission opportunity occurs over which the packet may be transmitted. As the buffer grows, the amount of time for a new packet added to the buffer to be transmitted may increase. Thus, the UID may also increase, which may decrease the efficiency of wireless communications or degrade user experience.

To mitigate the increased latency associated with an increased buffer size, various aspects describe herein provide for the UE 115 to decrease a rate at which a UE 115 generates packets when the buffer grows above a threshold amount (e.g., when a quantity of packets or bytes in the buffer exceeds the threshold amount). For instance, when the buffer grows above the threshold amount, a service layer monitoring the buffer may provide, to an application layer of the UE 115, an indication to decrease the rate at which packets are generated. Additionally, when the buffer shrinks below the threshold amount or some second threshold amount (e.g., when the quantity of packets or bytes in the buffer is below the threshold amount or the second threshold amount), the UE 115 may increase a rate at which the UE 115 generates packets. Increasing the rate in such circumstances may enable improved performance (e.g., packet generation may be more responsive to user action). In some examples, the service layer may be a flow control layer (e.g., PDCP, RLC), which may provide the indication to update the rate to the application layer via a cross-layer API.

Another technique to mitigate the increased latency associated with the increase in buffer size may be for the flow control layer of the UE 115 to indicate, to the application layer, a buffer size, which may enable the UE 115 to notify an application of the application layer to stop generating new packets when CG resources are deactivated and/or when the buffer grows above the threshold amount. Additionally, when CGs are reactivated and/or when the buffer shrinks below the threshold amount or below the second threshold amount, the UE 115 may indicate, to the application, to resume generating new packets.

Figure 2:
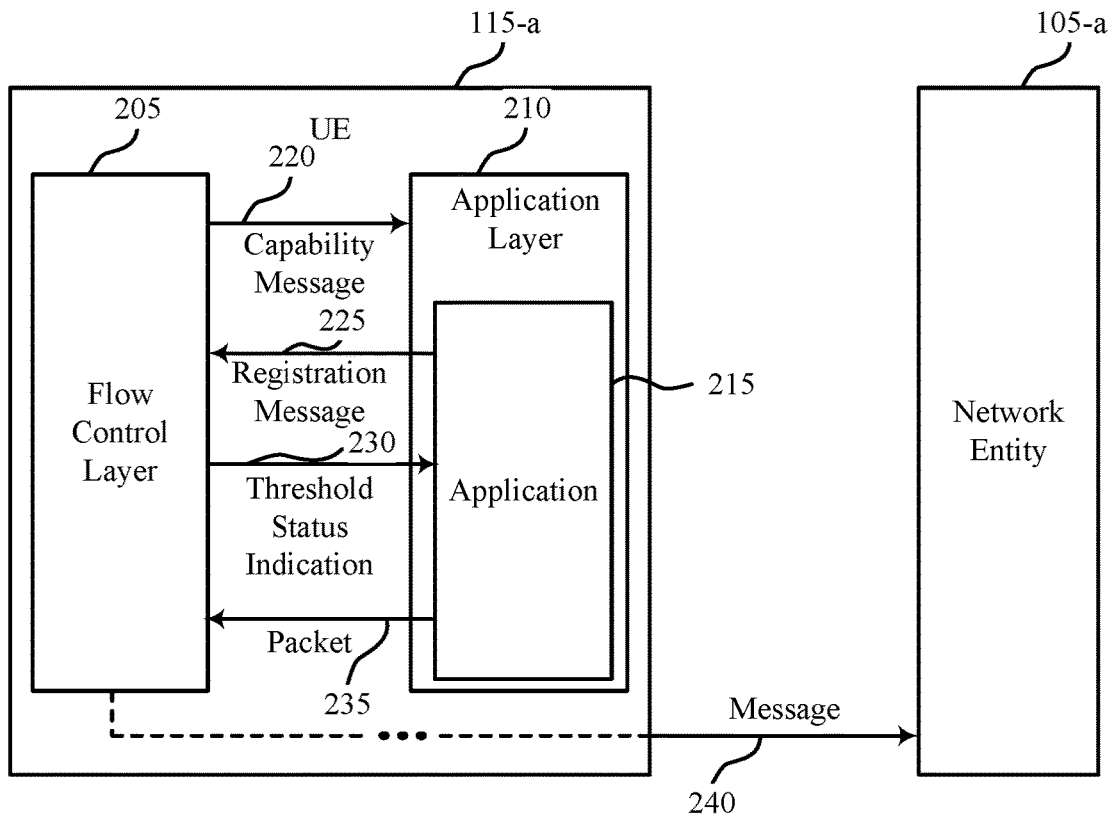
FIG. 2 shows an example of a wireless communications system that supports uplink packet management for user interaction delay reduction in accordance with one or more aspects of the present disclosure.

FIG. 2 shows an example of a wireless communications system 200 that supports uplink packet management for user interaction delay reduction in accordance with one or more aspects of the present disclosure. In some examples, wireless communications system 200 may implement one or more aspects of wireless communications system 100. For instance, UE 115-*a* may be an example of a UE 115 as described with reference to FIG. 1 and/or network entity 105-*a* may be an example of a network entity 105

UE 115-*a* may perform communications associated with XR and/or cloud gaming with network entity 105-*a*. Such communications may have various QoS constraints, such as a latency below a respective predefined threshold, a reliability above a respective predefined threshold, a bandwidth above a respective predefined threshold, a power consumption below a respective predefined threshold, or any combination thereof. Downlink XR traffic may include a video feed (e.g., a real-time video feed) from a server (e.g., a data server communicating with network entity 105-*a*, a game server communicating with network entity 105-*a*). Uplink XR traffic may include user pose measurements and/or application-layer controller data. Pose measurements may include UE 115-*a* providing Degrees of Freedom (DoF) (e.g., 6 DoF) data from a user (e.g., a human user) and/or data (e.g., action data) from controller and/or hand tracking. Control data may include channel quality information provided to a server (e.g., a server communicating with network entity 105-*a*) to enable real-time rate adaption, which may enable downlink delays to be reduced (e.g., minimized).

In XR applications, a UID may be present when UE 115-*a* communicates with a network entity 105-*a*, where the UID may be defined as a duration between when a user action is initiated and when this action is integrated by the server communicating with network entity 105-*a*. UID may be a function of an uplink update rate (e.g., a rate at which uplink packets are generated) and a transmission delay associated with such updates. In some examples, UID may be decomposed as a delay between user action to generation of next update packet (e.g., dependent on the update rate); a queueing delay at UE 115-*a* until a generated packet is scheduled (e.g., dependent on the update rate and the transmission delays); a transmission delay from UE 115-*a* to network entity 105-*a* (e.g., dependent on the transmission delays); a queueing delay at network entity 105-*a* (e.g., dependent on transmission delays and/or the update rate), which may be defined by a time between the arrival of a packet in a buffer of network entity 105-*a* and a beginning of a transmission to the server; a transmission delay from network entity 105-*a* to the server, which may be defined as a time from a beginning to an end of a transmission of each packet of an uplink update message from network entity 105-*a* to the server; a state update delay (e.g., computation delay) at the server; or any combination thereof.

In some examples, UE 115-*a* may have a buffer associated with a flow control layer 205 (e.g., an RLC layer, a PDCP layer), where the buffer may store a packet in a queue (e.g., a FIFO queue) until the packet is scheduled to be transmitted. In some examples, scenarios may occur in which queueing of uplink packets may have an effect on UID. For instance, in scenarios in which channel quality variations occur frequently (e.g., above a threshold amount over a time duration), such as when channel quality drops, the size of the buffer may increase. Additionally or alternatively, in scenarios in which HARQ retransmissions occur frequently (e.g., above a threshold amount over a time duration), the size of the buffer may increase due to delays in a packet being received. If the buffer size increases, increased latency may occur and, thus, UID may also increase. If UID increases above a threshold amount, the UID may be inconsistent with QoS constraints. Additionally, when multiple packets are stored in a same buffer, older packets may have a decreased value relative to newer packets and may also decrease the value of the newer packets due to delaying transmission of the newer packets. In order to decrease a likelihood that UID increases above the threshold amount and/or to mitigate older packets decreasing the value of newer packets, UE 115-*a* may adapt an update rate and/or an update timing according to a state of the buffer to enable the buffer to operate in a shallow buffer regime (e.g., to enable the buffer to have below a threshold quantity of packets at any given time).

In a first example, UE 115-*a* may adapt its uplink update rate (e.g., a rate at which uplink packets are generated) to control the buffer size, which may enable the uplink update rate to adapt to network conditions. For instance, UE 115-*a* may observe a state (e.g., a quantity of packets or bytes) of its RLC buffer and may provide it (e.g., the quantity or an indication of whether the quantity satisfies the threshold) to an application 215 of an application layer 210 via a cross-layer API between the application layer 210 and the flow control layer 205. In some examples, UE 115-*a* may observe the state periodically (e.g., according to a period). If the buffer is deep (e.g., if the buffer exceeds some threshold B_high), UE 115-*a* may notify (e.g., via the cross-layer API) the application 215 to decrease the uplink update rate. If the buffer is shallow (e.g., if the buffer is below some threshold B_low), UE 115-*a* may notify (e.g., via the cross-layer API) the application 215 to increase the uplink update rate.

In some examples, a single threshold may be used. For instance, UE 115-*a* may notify the application to decrease the uplink update rate if the buffer exceeds B_high and may notify the application to increase the uplink update rate if the buffer is below B_high). In other examples, two or more thresholds may be used. For example, once the uplink update rate has been decreased, UE 115-*a* may notify the application to increase the uplink update rate if the buffer is below B_low, where B_low may be different than B_high. In another example using multiple thresholds, UE 115-*a* may notify the application to use a first update rate if the buffer is below B_thresh1; to use a second update rate if the buffer is above B_thresh1 but below B_thresh2; and to use a third update rate if the buffer is above B_thresh2, where B_thresh1<B_thresh2, and where the first update rate is greater than the second update rate and the second update rate is greater than the third update rate. In some examples, which update rate to use may be a function of buffer length (e.g., the function may be a discrete function such as a step function). Additional details about the first example may be described herein, for instance, with reference to FIG. 3.

In a second example, UE 115-*a* may stop or resume packet generation based on a quantity of packets or bytes in the buffer and/or based on whether CG resources are activated. For instance, CG interruption by network entity 105-*a* may lead to a drop in channel quality which may lead to a mismatch between the CG and the channel quality. By notifying the application 215 to stop packet generation while CG is deactivated and/or while the quantity of packets or bytes in the buffer is above a threshold level, the packets may be drained from the buffer and the buffer level may decrease (e.g., using dynamic grants (DGs), such as grants indicated in downlink control information (DCI)). For instance, while CG is deactivated and the buffer is deep (e.g., if the buffer exceeds some threshold B_high), UE 115-*a* may suspend new packet generation and let its buffer drain via DGs. Additionally, if CG is reactivated or the buffer is empty or shallow (e.g., if the buffer is below or equal to some threshold B_low), packet generation may be resumed and aligned to a new grant. By stopping packet generation temporarily and then resuming packet generation later (e.g., once uplink resources become available), the packets received by network entity 105-*a* may experience reduced queueing delay and may carry more recent information (e.g., compared to packets that may have been generated if packet generation was not stopped). Additional details about the second example may be described herein, for instance, with reference to FIG. 4.

In the present example depicted in FIG. 2, UE 115-*a* may provide, from flow control layer 205 to the application layer 210, a capability message 220. The capability message 220 may include an indication that UE 115-*a* supports a service (e.g., a cross-layer API) for providing flow control information (e.g., a buffer size, an indication to adjust an update rate, an indication to resume or suspend packet generation) from the flow control layer 205 to the application layer 210 for support of XR traffic. UE 115-*a* may also receive, at the flow control layer 205 from an application 215 of the application layer 210, a message (e.g., a registration message 225) registering a flow (e.g., a QoS flow) associated with the application with the service (e.g., the cross-layer API) for providing the flow control information.

UE 115-*a* may provide, from the flow control layer 205 to the application layer 210 via the service (e.g., the cross-layer API), an indication of whether the quantity of packets or bytes in the buffer of the flow control layer 205 associated with the flow satisfies a threshold (e.g., a threshold status indication 230). In such examples, UE 115-*a* may provide the threshold status indication 230 based on receiving the registration message 225. In some examples (e.g., when UE 115-*a* is operating according to the first example described herein), the flow control layer 205 providing the indication whether the quantity of packets or bytes in the buffer satisfies the threshold may include an indication to adjust an update rate for generating packets associated with the application layer 210. In some such examples, the indication to adjust the update rate may be an indication to adjust the update rate to a first value and UE 115-*a* may provide, from the flow control layer 205 to the application 215 via a service (e.g., via the cross-layer API), an indication of whether the quantity of packets or bytes in the buffer of the flow control layer 205 associated with the flow satisfies a second threshold, where the indication that the quantity of packets or bytes in the buffer satisfies the second threshold includes an indication to adjust the update rate to a second value. In some examples, failing to satisfy the threshold may include a first value of the quantity of packets or bytes being greater than the threshold (e.g., being greater than B_high) and satisfying the second threshold may include a second value of the quantity of packets or bytes being less than or equal to the second threshold (e.g., being lower than or equal to B_low).

In some examples (e.g., when UE 115-*a* is operating according to the second example described herein), UE 115-*a* may provide, from the flow control layer 205 to the application layer 210 using the service (e.g., based on the quantity of packets in the buffer failing to satisfy the threshold), an indication to suspend generating packets. The application may suspend generating packets by, for example, suppressing generating one or more packets for an update rate. For example, the application may maintain a current update rate but skip generating packets for one or more cycles according to the update rate. Additionally, UE 115-*a* may provide, from the flow control layer 205 to the application layer 210 using the service, an indication to resume generating packets, where the indication to resume generating packets includes an indication that a second value of the quantity of packets or bytes satisfies the second threshold. In some examples, the indication to suspend generating packets includes an indication that a CG for UE 115-*a* is deactivated. In some examples, the indication to resume generating packets includes an indication that the CG is reactivated.

UE 115-*a* may obtain, from the application 215 (e.g., at the flow control layer 205), a packet 235 (e.g., an internet protocol (IP) packet) associated with the flow based on providing the indication of whether the quantity of packets or bytes in the buffer of the flow control layer satisfy the threshold. UE 115-*a* may transmit, to network entity 105-*a*, over a wireless channel (e.g., one or more physical uplink shared channel (PUSCH) transmission), a message 240 including the obtained packet 235.

In some examples, the techniques described herein may be associated with one or more advantages. For instance, decreasing the uplink update rate or stopping packet generation when the quantity of packets or bytes in the buffer exceeds a threshold amount (e.g., due to poor radio conditions) may mitigate aging of newer update packets by enabling the buffer to drain out older packets before increasing the uplink update rate or resuming packet generation. Accordingly, the techniques described herein may enable UE 115-*a* to control and/or reduce its buffer length, which may enable packets to be transmitted with a reduced latency on average and to have a reduced UID. Additionally, decreasing the uplink update rate or stopping packet generation may be advantageous over delaying packet transmission time, as delaying packet transmission time may not reduce UID, whereas decreasing the uplink update rate or stopping packet generation may reduce UID.

Figure 3:
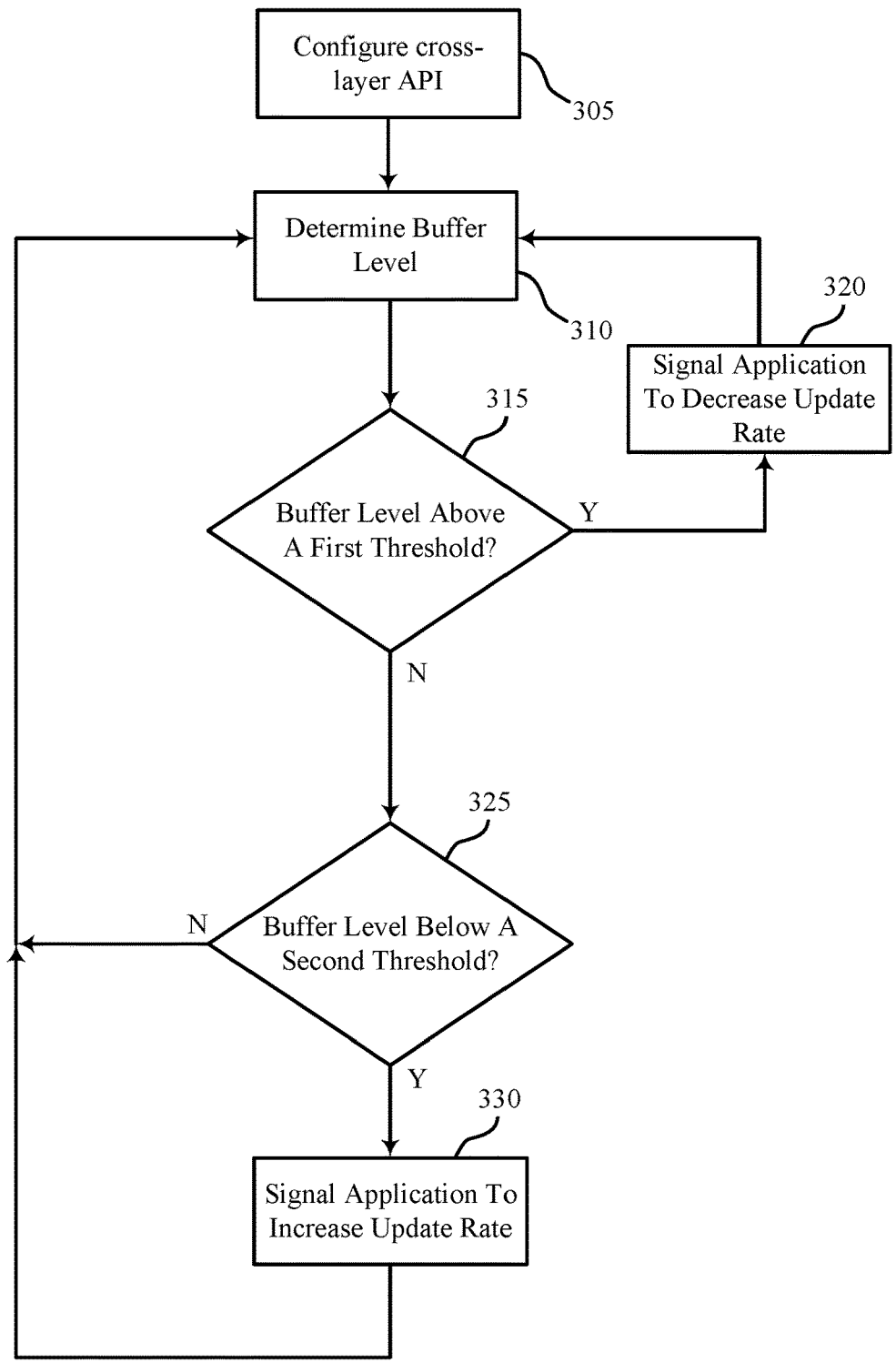
FIG. 3 shows an example of a decision flow that supports uplink packet management for user interaction delay reduction in accordance with one or more aspects of the present disclosure.

FIG. 3 shows an example of a decision flow 300 that supports uplink packet management for user interaction delay reduction in accordance with one or more aspects of the present disclosure. In some examples, decision flow 300 may be implemented by one or more aspects of wireless communications system 200. For instance, decision flow 300 may represent a set of operations that UE 115-*a* performs to adjust an uplink update rate as described herein.

In the present example depicted in FIG. 3, a UE (e.g., UE 115-*a*) may configure a cross-layer API at 305. Configuring the cross-layer API may include sending a capability message from a flow control layer to an application layer of the UE. The capability message may include an indication that UE supports a service (e.g., a cross-layer API) for providing flow control information (e.g., a buffer size, an indication to adjust an update rate, an indication to resume or suspend packet generation) from the flow control layer to the application layer for support of XR traffic. Configuring the cross-layer API at 305 may include an application (e.g., application 215) registering for the service (e.g., for a flow of the application).

The UE may determine a level of a buffer associated with a flow of the application at 310. The UE may detect, at 315, whether a buffer level (e.g., of a PDCP buffer or an RLC buffer) is above a first threshold. For instance, the UE may detect whether the buffer level is above B_high as described herein. If the buffer level is above the first threshold, the UE may proceed to 320. However, if the buffer level is not above the first threshold, the UE may proceed to 325. At 320, the UE may signal to the application to decrease its update rate.

At 325, the UE may detect whether the buffer level is above a second threshold. For instance, the UE may detect whether the buffer level is below (e.g., or equal to) B_low as described herein. If the buffer level is below (e.g., or equal to) the second threshold, the UE may proceed to 330. If the buffer level is above the second threshold, the UE may proceed to 310. At 330, the UE may signal the application to increase its update rate.

Figure 4:
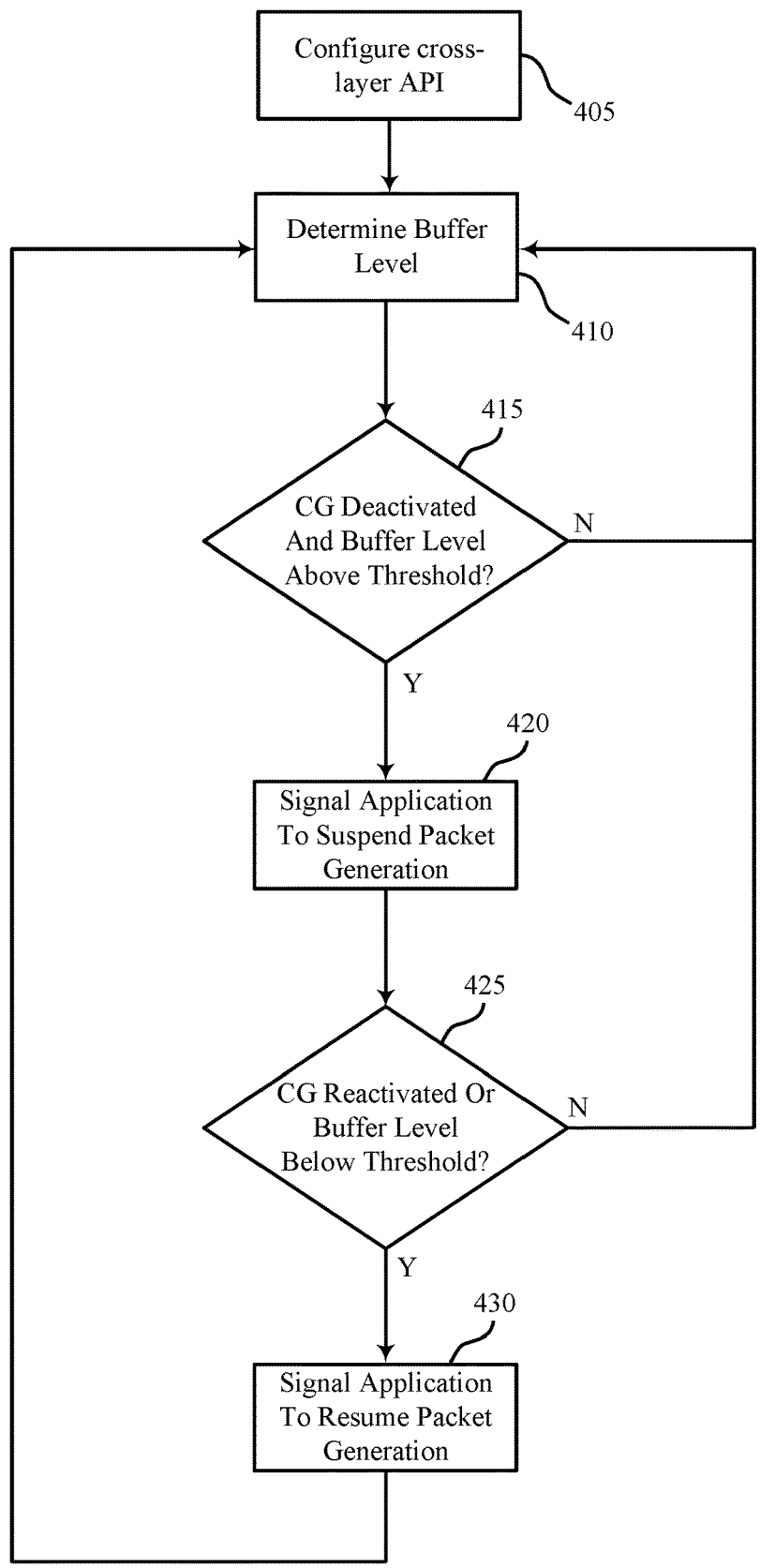
FIG. 4 shows an example of a decision flow that supports uplink packet management for user interaction delay reduction in accordance with one or more aspects of the present disclosure.

FIG. 4 shows an example of a decision flow 400 that supports uplink packet management for user interaction delay reduction in accordance with one or more aspects of the present disclosure. In some examples, decision flow 400 may be implemented by one or more aspects of wireless communications system 200. For instance, decision flow 400 may represent a set of operations that UE 115-a performs to suspend and/or resume uplink packet generation as described herein.

In the present example depicted in FIG. 4, a UE (e.g., UE 115-a) may configure a cross-layer API at 405. Configuring the cross-layer API may include sending a capability message from a flow control layer to an application layer of the UE. The capability message may include an indication that UE supports a service (e.g., a cross-layer API) for providing flow control information (e.g., a buffer size, an indication to adjust an update rate, an indication to resume or suspend packet generation) from the flow control layer to the application layer for support of XR traffic. Configuring the cross-layer API at 405 may include an application (e.g., application 215) registering for the service (e.g., for a flow of the application).

For example, the application may register to the cross-layer API service, which may provide a buffer size indication (e.g., an indication of a RLC buffer or PDCP buffer size). Additionally, the application may subscribe to a CG patterns event API service (e.g., in which a modem of the UE indicates to the application when CG is activated or deactivated). When a network entity (network entity 105-a) schedules CG, the application of the UE may align packet generation to the CG. Upon a trigger condition, such as CG interruption from the network entity and a buffer buildup being detected (e.g., due to repeated retransmissions, such as repeated HARQ-based retransmissions), the UE may notify the application to suspend uplink packet generation. In such examples, the network entity may schedule successive DGs (e.g., successive DCI grants) and the UE may use them to drain its buffer. The UE may resume packet generation upon an end of the trigger condition For instance, if the buffer is drained, the UE may align its packet generation time to the DG. Additionally or alternatively, if CG is reactivated, the UE may align packet generation time to the CG.

The UE may determine a level of a buffer associated with a flow of the application at 410. The UE may detect, at 415, whether CG is deactivated and whether a buffer level (e.g., of a PDCP buffer, an RLC buffer) is above a first threshold. For instance, the UE may detect whether the buffer level is above B_high as described herein. If the buffer level is above the first threshold, the UE may proceed to 420. However, if the buffer level is not above the first threshold, the UE may proceed to 410. At 420, the UE may signal the application (e.g., application 215) to suspend packet generation.

At 425, the UE may detect whether CG is reactivated or whether the buffer level is below a second threshold. For instance, the UE may detect whether the buffer level is below (e.g., or equal to) the B_low. If the buffer level is below (e.g., or equal to) the second threshold, the UE may proceed to 430. If the buffer level is above the second threshold, the UE may proceed to 410. At 430, the UE may signal the application to resume packet generation and may proceed to 410.

Figure 5:
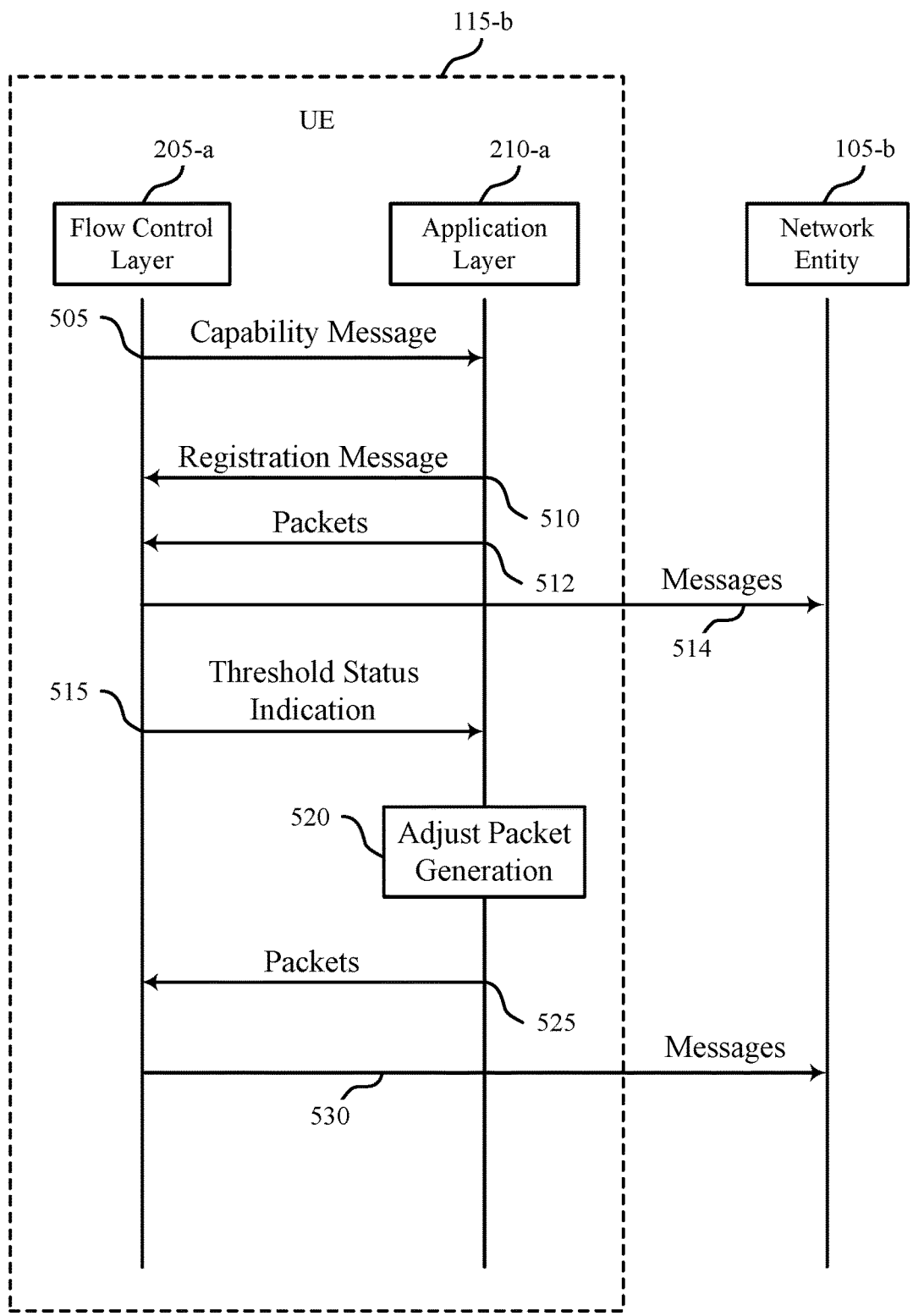
FIG. 5 shows an example of a process flow that supports uplink packet management for user interaction delay reduction in accordance with one or more aspects of the present disclosure.

FIG. 5 shows an example of a process flow 500 that supports uplink packet management for user interaction delay reduction in accordance with one or more aspects of the present disclosure. In some examples, process flow 500 may be implemented by one or more aspects of wireless communications systems 100 and/or 200. For instance, UE 115-b may be an example of a UE 115 as described with reference to FIG. 1 and/or UE 115-a as described with reference to FIG. 2. Additionally, network entity 105-b may be an example of a network entity 105 as described with reference to FIG. 1 and/or network entity 105-a as described with reference to FIG. 2. Additionally, flow control layer 205-a may be an example of flow control layer 205 as described with reference to FIG. 2 and/or application layer 210-a may be an example of application layer 210 as described with reference to FIG. 2.

At 505, flow control layer 205-a may provide, to application layer 210-a, a capability message including an indication that UE 115-b supports a service for providing flow control information from the flow control layer 205-a to the application layer 210-a for support of extended reality traffic. In some examples, the flow control layer is an RLC layer or a PDCP layer.

At 510, an application of application layer 210-a may provide, to flow control layer 205-a, a first message registering a flow associated with the application with the service for providing the flow control information. At 512, the application layer 210-a may send packets to flow control layer 205-a (e.g., according to an update rate). At 514, UE 115-b may transmit (e.g., from the buffer of flow control layer 205-a), to network entity 105-b over a wireless channel, messages including the packets obtained at 512. However, in some cases, the packets transmitted in the messages at 514 may not clear the buffer prior to additional packets coming from the application layer 210-a and a quantity of packets in the buffer may increase. For example, channel conditions for a wireless link used to transmit the messages may be degraded, or retransmissions for the messages may occur, increasing the time delay for successfully transmitting each message.

At 515, flow control layer 205-a may provide, to the application via the service, an indication that a quantity of packets or bytes in a buffer of the flow control layer associated with the flow fails to satisfy a threshold based on receiving the first message registering the flow with the service. In some examples, providing the indication that the quantity of packets or bytes in the buffer fails to satisfy the threshold includes an indication to adjust the update rate for generating packets associated with the application. In some such examples, the indication to adjust the update rate includes an indication to adjust the update rate to a first value. In some such examples, flow control layer 205-a may provide, to the application via the service, an indication that the quantity of packets or bytes in the buffer of flow control layer associated with the flow satisfies a second threshold, where the indication that the quantity of packets or bytes in the buffer satisfies the second threshold includes an indication to adjust the update rate to a second value. In some such examples, the quantity of packets or bytes failing to satisfy the threshold includes a first value of the quantity of packets or bytes being greater than the threshold and the quantity of packets or bytes satisfying the second threshold includes a second value of the quantity of packets or bytes being less than or equal to the second threshold.

In some examples, flow control layer 205-a may provide, to the application layer 210-a using the service based on the quantity of packets in the buffer failing to satisfy the threshold, an indication to suspend generating packets. Additionally, flow control layer 205-a may provide, to the application layer 210-a using the service, an indication to resume generating packets, where the indication to resume generating packets includes an indication that a second value of the quantity of packets or bytes satisfies a second threshold. In some examples, the indication to suspend generating packets includes an indication that a CG for UE 115-b is deactivated. In some examples, the indication to resume generating packets includes an indication that the CG is reactivated.

At 520, application layer 210-a may adjust packet generation. For instance, application layer 210-a may adjust an application update rate. Additionally or alternatively, application layer 210-a may suppress (e.g., suspend) packet generation.

At 525, flow control layer 205-a may obtain, from the application, packets associated with the flow based on providing the indication that the quantity of packets or bytes in the buffer fails to satisfy the threshold. In some examples, the packets are obtained from the application layer 210-a based on providing the indication to adjust the update rate for generating packets.

At 530, UE 115-b may transmit (e.g., from the buffer of flow control layer 205-a), to network entity 105-b over a wireless channel, messages including the obtained packets.

Figure 6:
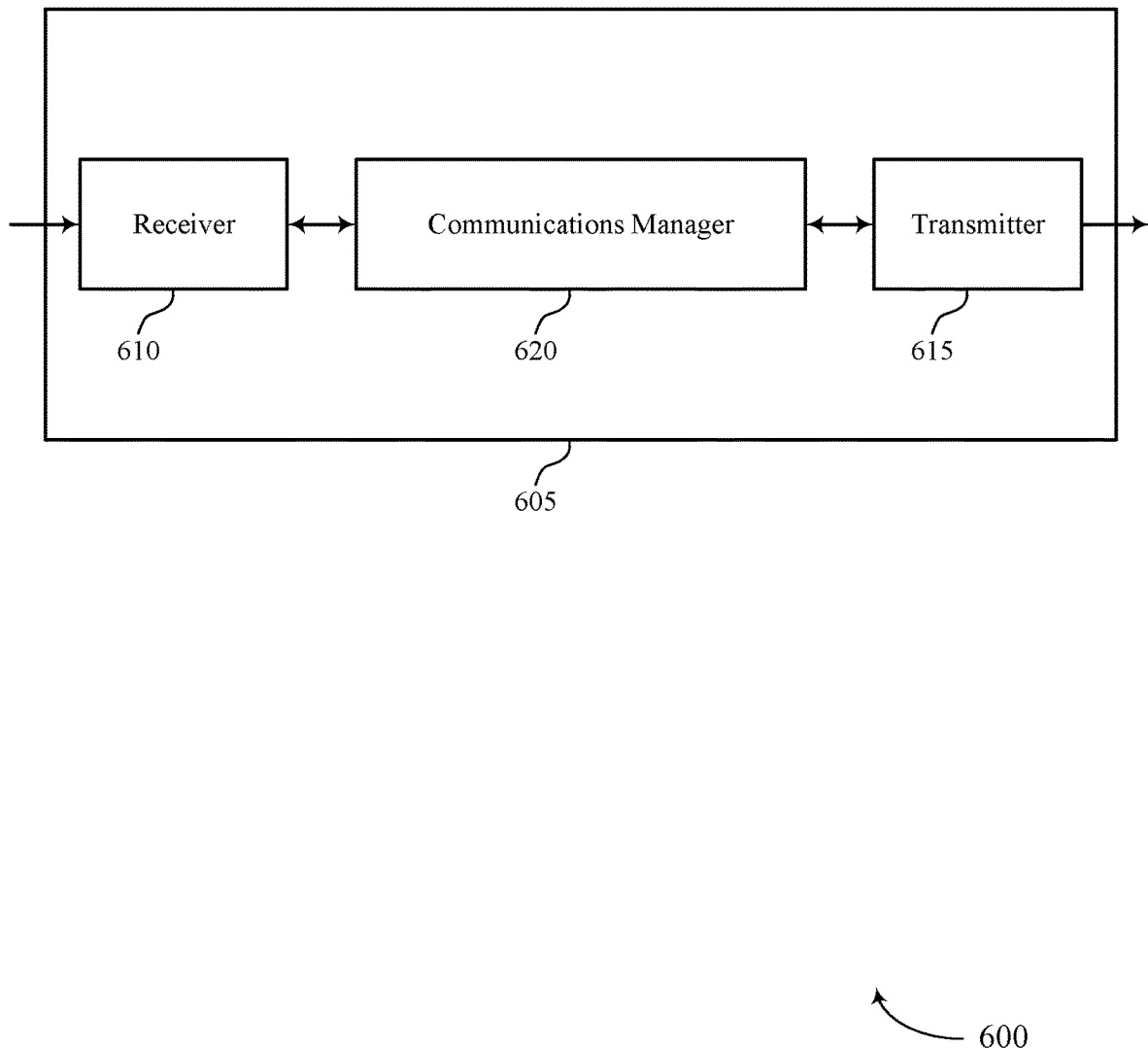
FIGS. 6 and 7 show block diagrams of devices that support uplink packet management for user interaction delay reduction in accordance with one or more aspects of the present disclosure.

FIG. 6 shows a block diagram 600 of a device 605 that supports uplink packet management for user interaction delay reduction in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink packet management for user interaction delay reduction). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink packet management for user interaction delay reduction). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of uplink packet management for user interaction delay reduction as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 is capable of, configured to, or operable to support a means for providing, from a flow control layer of the UE to an application layer, a capability message including an indication that the UE supports a service for providing flow control information from the flow control layer to the application layer for support of extended reality traffic. The communications manager 620 is capable of, configured to, or operable to support a means for receiving, from an application of the application layer, a first message registering a flow associated with the application with the service for providing the flow control information. The communications manager 620 is capable of, configured to, or operable to support a means for providing, from the flow control layer to the application via the service, an indication that a quantity of packets or bytes in a buffer of the flow control layer associated with the flow fails to satisfy a threshold based on receiving the first message registering the flow with the service. The communications manager 620 is capable of, configured to, or operable to support a means for obtaining, from the application, a packet associated with the flow based on providing the indication that the quantity of packets or bytes in the buffer fails to satisfy the threshold.

The communications manager 620 is capable of, configured to, or operable to support a means for transmitting, to a network entity over a wireless channel, a second message including the obtained packet.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for a device 605 to reduce an average latency associated with providing a packet to a network entity.

Figure 7:
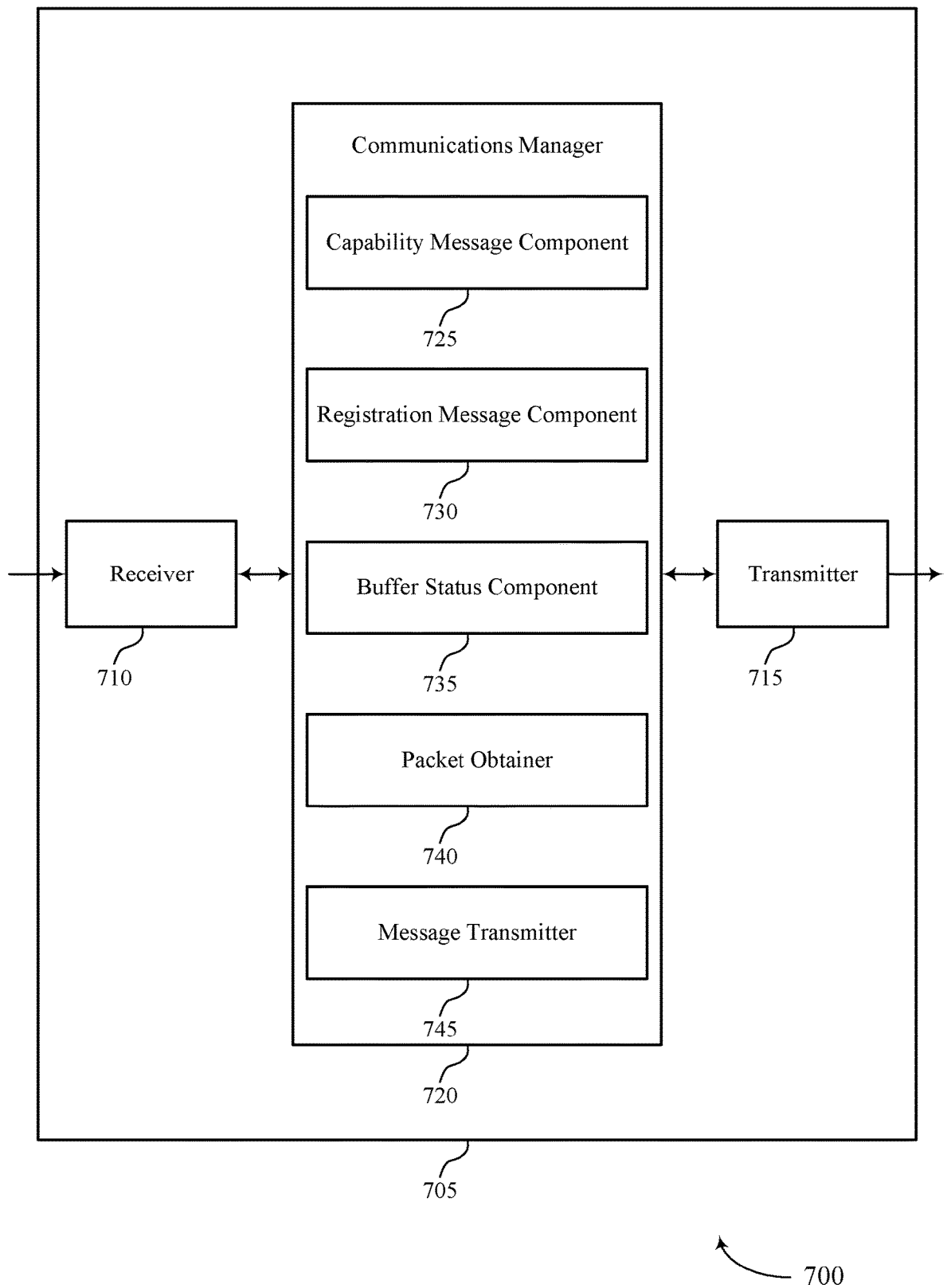

FIG. 7 shows a block diagram 700 of a device 705 that supports uplink packet management for user interaction delay reduction in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to uplink packet management for user interaction delay reduction). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink packet management for user interaction delay reduction). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of uplink packet management for user interaction delay reduction as described herein. For example, the communications manager 720 may include a capability message component 725, a registration message component 730, a buffer status component 735, a packet obtainer 740, a message transmitter 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The capability message component 725 is capable of, configured to, or operable to support a means for providing, from a flow control layer of the UE to an application layer, a capability message including an indication that the UE supports a service for providing flow control information from the flow control layer to the application layer for support of extended reality traffic. The registration message component 730 is capable of, configured to, or operable to support a means for receiving, from an application of the application layer, a first message registering a flow associated with the application with the service for providing the flow control information. The buffer status component 735 is capable of, configured to, or operable to support a means for providing, from the flow control layer to the application via the service, an indication that a quantity of packets or bytes in a buffer of the flow control layer associated with the flow fails to satisfy a threshold based on receiving the first message registering the flow with the service. The packet obtainer 740 is capable of, configured to, or operable to support a means for obtaining, from the application, a packet associated with the flow based on providing the indication that the quantity of packets or bytes in the buffer fails to satisfy the threshold. The message transmitter 745 is capable of, configured to, or operable to support a means for transmitting, to a network entity over a wireless channel, a second message including the obtained packet.

Figure 8:
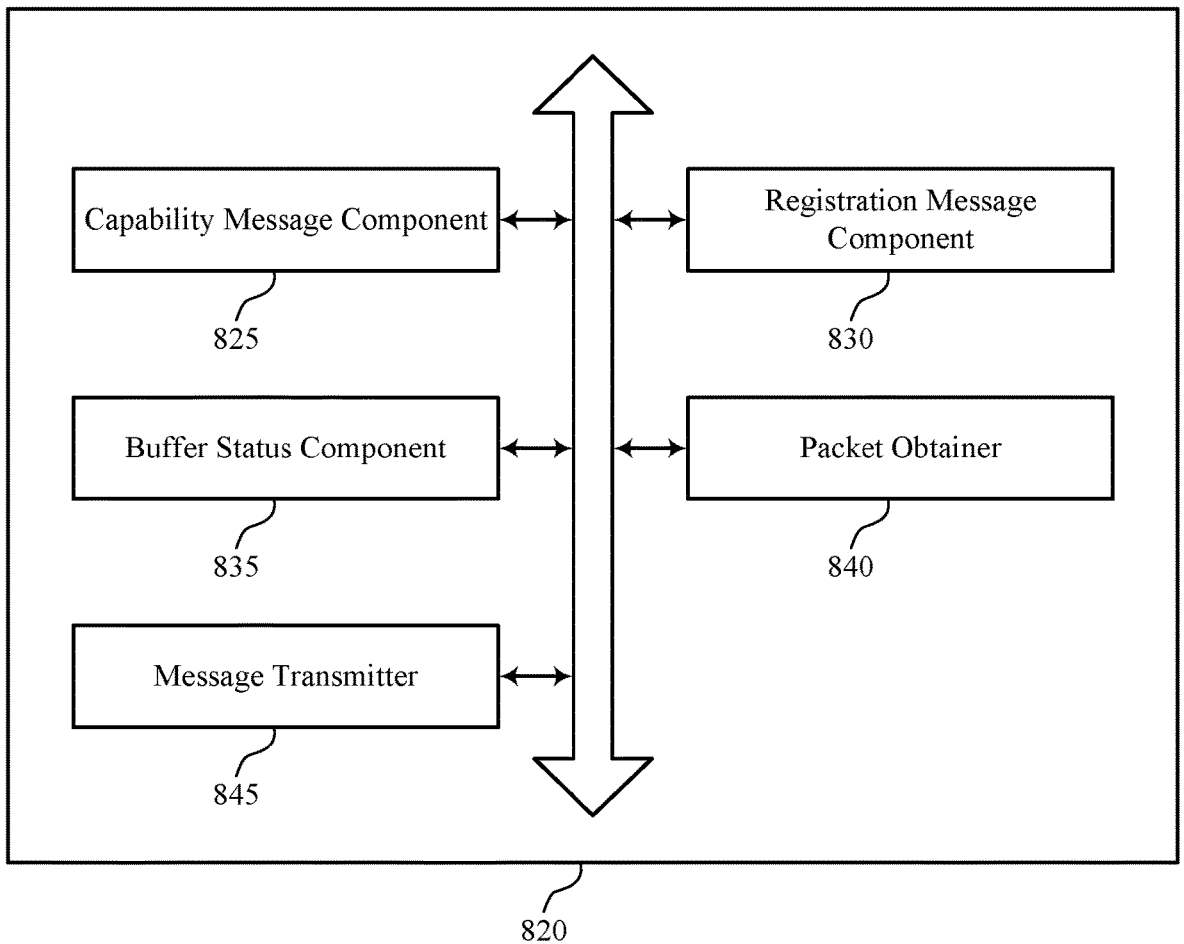
FIG. 8 shows a block diagram of a communications manager that supports uplink packet management for user interaction delay reduction in accordance with one or more aspects of the present disclosure.

FIG. 8 shows a block diagram 800 of a communications manager 820 that supports uplink packet management for user interaction delay reduction in accordance with one or more aspects of the present disclosure. The communications manager 820 may be an example of aspects of a communications manager 620, a communications manager 720, or both, as described herein. The communications manager 820, or various components thereof, may be an example of means for performing various aspects of uplink packet management for user interaction delay reduction as described herein. For example, the communications manager 820 may include a capability message component 825, a registration message component 830, a buffer status component 835, a packet obtainer 840, a message transmitter 845, or any combination thereof. Each of these components may communicate, directly or indirectly, with one another (e.g., via one or more buses).

The communications manager 820 may support wireless communications at a UE in accordance with examples as disclosed herein. The capability message component 825 is capable of, configured to, or operable to support a means for providing, from a flow control layer of the UE to an application layer, a capability message including an indication that the UE supports a service for providing flow control information from the flow control layer to the application layer for support of extended reality traffic. The registration message component 830 is capable of, configured to, or operable to support a means for receiving, from an application of the application layer, a first message registering a flow associated with the application with the service for providing the flow control information. The buffer status component 835 is capable of, configured to, or operable to support a means for providing, from the flow control layer to the application via the service, an indication that a quantity of packets or bytes in a buffer of the flow control layer associated with the flow fails to satisfy a threshold based on receiving the first message registering the flow with the service. The packet obtainer 840 is capable of, configured to, or operable to support a means for obtaining, from the application, a packet associated with the flow based on providing the indication that the quantity of packets or bytes in the buffer fails to satisfy the threshold. The message transmitter 845 is capable of, configured to, or operable to support a means for transmitting, to a network entity over a wireless channel, a second message including the obtained packet.

In some examples, providing the indication that the quantity of packets or bytes in the buffer fails to satisfy the threshold includes an indication to adjust an update rate for generating packets associated with the application layer. In some examples, the packet is obtained from the application layer based on providing the indication to adjust the update rate for generating packets.

In some examples, the indication to adjust the update rate includes an indication to adjust the update rate to a first value, and the buffer status component 835 is capable of, configured to, or operable to support a means for providing, from the flow control layer to the application via the service, an indication that the quantity of packets or bytes in the buffer of the flow control layer associated with the flow satisfies a second threshold, where the indication that the quantity of packets or bytes in the buffer satisfies the second threshold includes an indication to adjust the update rate to a second value.

In some examples, the quantity of packets or bytes failing to satisfy the threshold includes a first value of the quantity of packets or bytes being greater than the threshold. In some examples, the quantity of packets or bytes satisfying the second threshold includes a second value of the quantity of packets or bytes being less than or equal to the second threshold.

In some examples, the buffer status component 835 is capable of, configured to, or operable to support a means for providing, from the flow control layer to the application layer using the service based on the quantity of the packets in the buffer failing to satisfy the threshold, an indication to suspend generating packets.

In some examples, the buffer status component 835 is capable of, configured to, or operable to support a means for providing, from the flow control layer to the application layer using the service, an indication to resume generating packets, where the indication to resume generating packets includes an indication that a second value of the quantity of packets or bytes satisfies a second threshold.

In some examples, the indication to suspend generating packets includes an indication that a configured grant (CG) for the UE is deactivated.

In some examples, the indication to resume generating packets includes an indication that the CG is reactivated.

In some examples, the flow control layer includes an RLC layer or a packet data convergence protocol (PDCP) layer.

Figure 9:
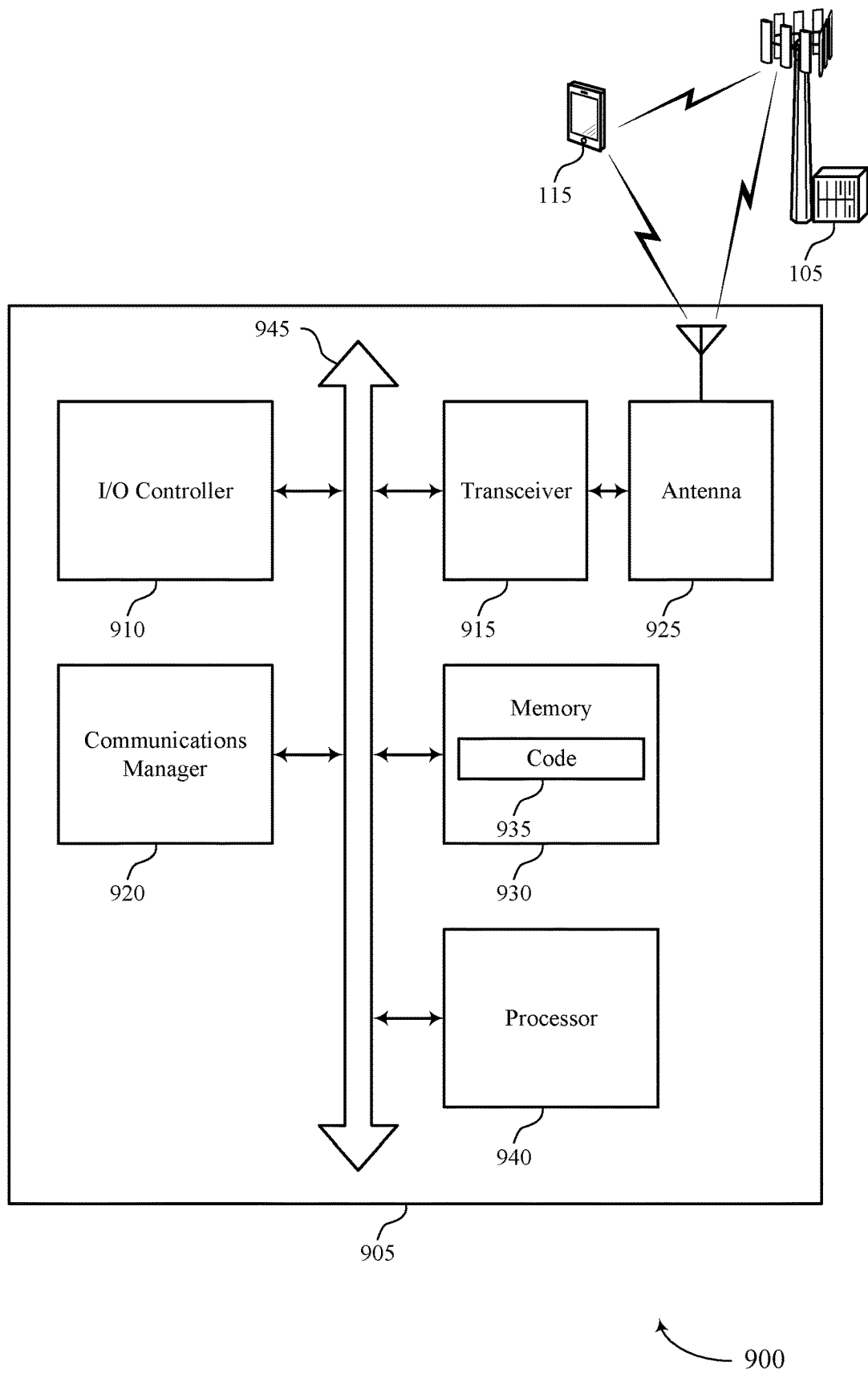
FIG. 9 shows a diagram of a system including a device that supports uplink packet management for user interaction delay reduction in accordance with one or more aspects of the present disclosure.

FIG. 9 shows a diagram of a system 900 including a device 905 that supports uplink packet management for user interaction delay reduction in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting uplink packet management for user interaction delay reduction). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 is capable of, configured to, or operable to support a means for providing, from a flow control layer of the UE to an application layer, a capability message including an indication that the UE supports a service for providing flow control information from the flow control layer to the application layer for support of extended reality traffic. The communications manager 920 is capable of, configured to, or operable to support a means for receiving, from an application of the application layer, a first message registering a flow associated with the application with the service for providing the flow control information. The communications manager 920 is capable of, configured to, or operable to support a means for providing, from the flow control layer to the application via the service, an indication that a quantity of packets or bytes in a buffer of the flow control layer associated with the flow fails to satisfy a threshold based on receiving the first message registering the flow with the service. The communications manager 920 is capable of, configured to, or operable to support a means for obtaining, from the application, a packet associated with the flow based on providing the indication that the quantity of packets or bytes in the buffer fails to satisfy the threshold. The communications manager 920 is capable of, configured to, or operable to support a means for transmitting, to a network entity over a wireless channel, a second message including the obtained packet.

By including or configuring the communications manager 920 in accordance with examples as described herein, the device 905 may support techniques for a device 905 to reduce an average latency associated with providing a packet to a network entity.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of uplink packet management for user interaction delay reduction as described herein, or the processor 940 and the memory 930 may be otherwise configured to perform or support such operations.

Figure 10:
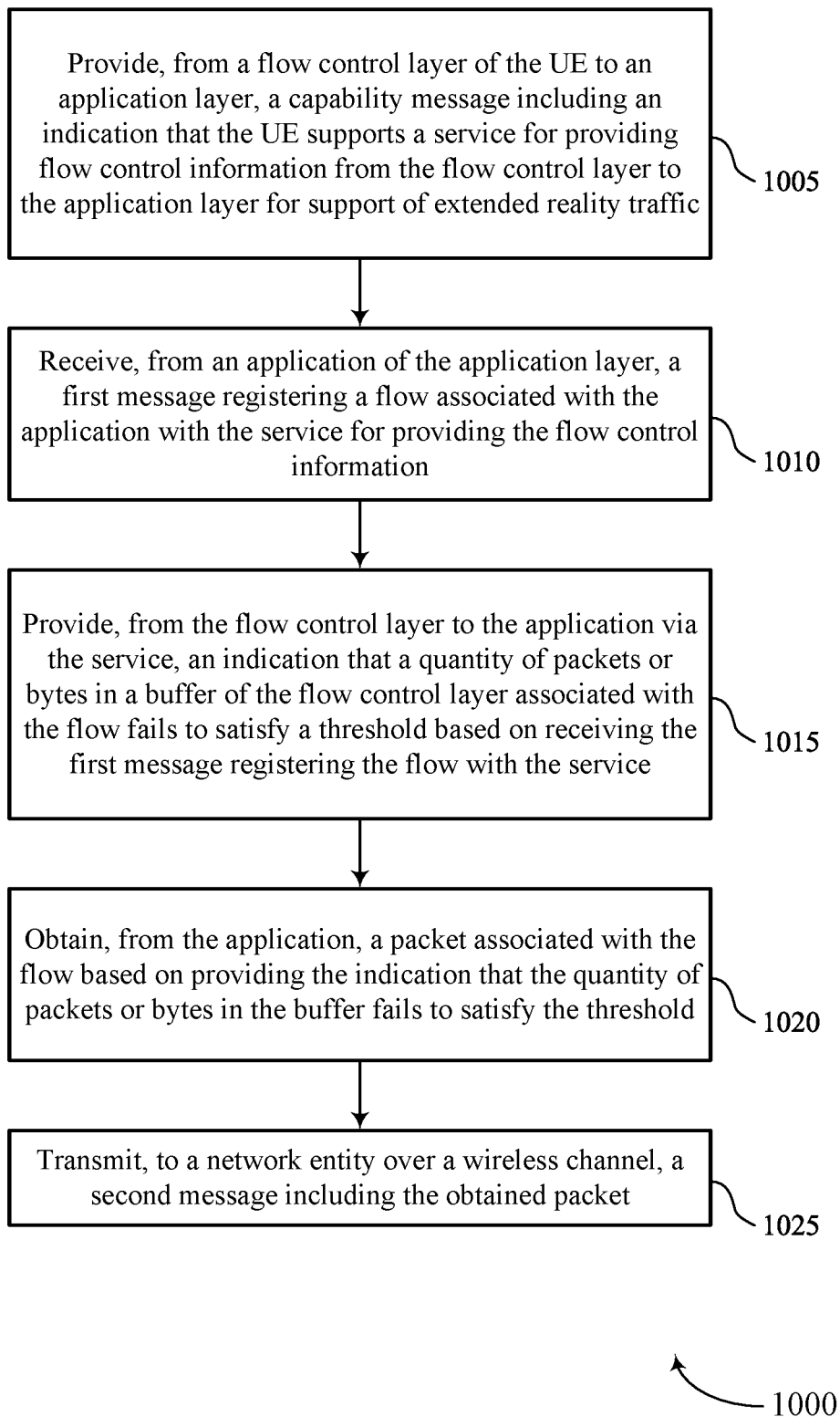
FIG. 10 shows a flowchart illustrating methods that support uplink packet management for user interaction delay reduction in accordance with one or more aspects of the present disclosure.

FIG. 10 shows a flowchart illustrating a method 1000 that supports uplink packet management for user interaction delay reduction in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include providing, from a flow control layer of the UE to an application layer, a capability message including an indication that the UE supports a service for providing flow control information from the flow control layer to the application layer for support of extended reality traffic. The operations of 1005 may be performed in accordance with examples as disclosed herein. In some examples, aspects of the operations of 1005 may be performed by a capability message component 825 as described with reference to FIG. 8.

At 1010, the method may include receiving, from an application of the application layer, a first message registering a flow associated with the application with the service for providing the flow control information. The operations of 1010 may be performed in accordance with examples as disclosed herein. In some examples, aspects of the operations of 1010 may be performed by a registration message component 830 as described with reference to FIG. 8.

At 1015, the method may include providing, from the flow control layer to the application via the service, an indication that a quantity of packets or bytes in a buffer of the flow control layer associated with the flow fails to satisfy a threshold based on receiving the first message registering the flow with the service. The operations of 1015 may be performed in accordance with examples as disclosed herein. In some examples, aspects of the operations of 1015 may be performed by a buffer status component 835 as described with reference to FIG. 8.

At 1020, the method may include obtaining, from the application, a packet associated with the flow based on providing the indication that the quantity of packets or bytes in the buffer fails to satisfy the threshold. The operations of 1020 may be performed in accordance with examples as disclosed herein. In some examples, aspects of the operations of 1020 may be performed by a packet obtainer 840 as described with reference to FIG. 8.

At 1025, the method may include transmitting, to a network entity over a wireless channel, a second message including the obtained packet. The operations of 1025 may be performed in accordance with examples as disclosed herein. In some examples, aspects of the operations of 1025 may be performed by a message transmitter 845 as described with reference to FIG. 8.

The following provides an overview of aspects of the present disclosure:

Aspect 1: A method for wireless communications at a UE, comprising: providing, from a flow control layer of the UE to an application layer, a capability message comprising an indication that the UE supports a service for providing flow control information from the flow control layer to the application layer for support of extended reality traffic; receiving, from an application of the application layer, a first message registering a flow associated with the application with the service for providing the flow control information; providing, from the flow control layer to the application via the service, an indication that a quantity of packets or bytes in a buffer of the flow control layer associated with the flow fails to satisfy a threshold based at least in part on receiving the first message registering the flow with the service; obtaining, from the application, a packet associated with the flow based at least in part on providing the indication that the quantity of packets or bytes in the buffer fails to satisfy the threshold; and transmitting, to a network entity over a wireless channel, a second message comprising the obtained packet.

Aspect 2: The method of aspect 1, wherein, providing the indication that the quantity of packets or bytes in the buffer fails to satisfy the threshold comprises an indication to adjust an update rate for generating packets associated with the application layer, and the packet is obtained from the application layer based at least in part on providing the indication to adjust the update rate for generating packets Aspect 3: The method of aspect 2, wherein the indication to adjust the update rate comprises an indication to adjust the update rate to a first value, the method further comprising: providing, from the flow control layer to the application via the service, an indication that the quantity of packets or bytes in the buffer of the flow control layer associated with the flow satisfies a second threshold, wherein the indication that the quantity of packets or bytes in the buffer satisfies the second threshold comprises an indication to adjust the update rate to a second value.

Aspect 4: The method of aspect 3, wherein, the quantity of packets or bytes failing to satisfy the threshold comprises a first value of the quantity of packets or bytes being greater than the threshold, and the quantity of packets or bytes satisfying the second threshold comprises a second value of the quantity of packets or bytes being less than or equal to the second threshold Aspect 5: The method of any of aspects 1 through 4, further comprising: providing, from the flow control layer to the application layer using the service based at least in part on the quantity of the packets in the buffer failing to satisfy the threshold, an indication to suspend generating packets.

Aspect 6: The method of aspect 5, further comprising: providing, from the flow control layer to the application layer using the service, an indication to resume generating packets, wherein the indication to resume generating packets comprises an indication that a second value of the quantity of packets or bytes satisfies a second threshold.

Aspect 7: The method of any of aspects 5 through 6, wherein the indication to suspend generating packets comprises an indication that a configured grant (CG) for the UE is deactivated.

Aspect 8: The method of aspect 7, wherein the indication to resume generating packets comprises an indication that the CG is reactivated.

Aspect 9: The method of any of aspects 1 through 8, wherein the flow control layer comprises an RLC layer or a packet data convergence protocol (PDCP) layer.

Aspect 10: An apparatus for wireless communications at a UE, comprising a processor; memory coupled with the processor; and instructions stored in the memory and executable by the processor to cause the apparatus to perform a method of any of aspects 1 through 9.

Aspect 11: An apparatus for wireless communications at a UE, comprising at least one means for performing a method of any of aspects 1 through 9.

Aspect 12: A non-transitory computer-readable medium storing code for wireless communications at a UE, the code comprising instructions executable by a processor to perform a method of any of aspects 1 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "the one or more components, individually or collectively."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   memory coupled with the one or more processors; and
   instructions stored in the memory and executable by the one or more processors to cause the apparatus to:
      provide, from a flow control layer of the UE to an application layer of the UE, a capability message comprising an indication that the UE supports a service for providing flow control information from the flow control layer to the application layer for support of extended reality traffic;
      receive, from an application of the application layer, a first message registering a flow associated with the application with the service for providing the flow control information;
      provide, from the flow control layer to the application via the service, an indication that a quantity of packets or bytes in a buffer of the flow control layer associated with the flow fails to satisfy a threshold based at least in part on receiving the first message registering the flow with the service;
      obtain, from the application, a packet associated with the flow based at least in part on providing the indication that the quantity of packets or bytes in the buffer fails to satisfy the threshold; and
      transmit, to a network entity over a wireless channel, a second message comprising the obtained packet.

2. The apparatus of claim 1, wherein:
   providing the indication that the quantity of packets or bytes in the buffer fails to satisfy the threshold comprises an indication to adjust an update rate for generating packets associated with the application layer, and
   the packet is obtained from the application layer based at least in part on providing the indication to adjust the update rate for generating packets.

3. The apparatus of claim 2, wherein the indication to adjust the update rate comprises an indication to adjust the update rate to a first value, and the instructions are further executable by the one or more processors to cause the apparatus to:
   provide, from the flow control layer to the application via the service, an indication that the quantity of packets or bytes in the buffer of the flow control layer associated with the flow satisfies a second threshold, wherein the indication that the quantity of packets or bytes in the buffer satisfies the second threshold comprises an indication to adjust the update rate to a second value.

4. The apparatus of claim 3, wherein:
   the quantity of packets or bytes failing to satisfy the threshold comprises a first value of the quantity of packets or bytes being greater than the threshold, and
   the quantity of packets or bytes satisfying the second threshold comprises a second value of the quantity of packets or bytes being less than or equal to the second threshold.

5. The apparatus of claim 1, wherein the instructions are further executable by the one or more processors to cause the apparatus to:
provide, from the flow control layer to the application layer using the service based at least in part on the quantity of the packets in the buffer failing to satisfy the threshold, an indication to suspend generating packets.

6. The apparatus of claim 5, wherein the instructions are further executable by the one or more processors to cause the apparatus to:
provide, from the flow control layer to the application layer using the service, an indication to resume generating packets, wherein the indication to resume generating packets comprises an indication that a second value of the quantity of packets or bytes satisfies a second threshold.

7. The apparatus of claim 5, wherein the indication to suspend generating packets comprises an indication that a configured grant (CG) for the UE is deactivated.

8. The apparatus of claim 7, wherein the indication to resume generating packets comprises an indication that the CG is reactivated.

9. The apparatus of claim 1, wherein the flow control layer comprises a radio link control (RLC) layer or a packet data convergence protocol (PDCP) layer.

10. A method for wireless communications at a user equipment (UE), comprising:
providing, from a flow control layer of the UE to an application layer of the UE, a capability message comprising an indication that the UE supports a service for providing flow control information from the flow control layer to the application layer for support of extended reality traffic;
receiving, from an application of the application layer, a first message registering a flow associated with the application with the service for providing the flow control information;
providing, from the flow control layer to the application via the service, an indication that a quantity of packets or bytes in a buffer of the flow control layer associated with the flow fails to satisfy a threshold based at least in part on receiving the first message registering the flow with the service;
obtaining, from the application, a packet associated with the flow based at least in part on providing the indication that the quantity of packets or bytes in the buffer fails to satisfy the threshold; and
transmitting, to a network entity over a wireless channel, a second message comprising the obtained packet.

11. The method of claim 10, wherein:
providing the indication that the quantity of packets or bytes in the buffer fails to satisfy the threshold comprises an indication to adjust an update rate for generating packets associated with the application layer, and
the packet is obtained from the application layer based at least in part on providing the indication to adjust the update rate for generating packets.

12. The method of claim 11, wherein the indication to adjust the update rate comprises an indication to adjust the update rate to a first value, the method further comprising:
providing, from the flow control layer to the application via the service, an indication that the quantity of packets or bytes in the buffer of the flow control layer associated with the flow satisfies a second threshold, wherein the indication that the quantity of packets or bytes in the buffer satisfies the second threshold comprises an indication to adjust the update rate to a second value.

13. The method of claim 12, wherein:
the quantity of packets or bytes failing to satisfy the threshold comprises a first value of the quantity of packets or bytes being greater than the threshold, and
the quantity of packets or bytes satisfying the second threshold comprises a second value of the quantity of packets or bytes being less than or equal to the second threshold.

14. The method of claim 10, further comprising:
providing, from the flow control layer to the application layer using the service based at least in part on the quantity of the packets in the buffer failing to satisfy the threshold, an indication to suspend generating packets.

15. The method of claim 14, further comprising:
providing, from the flow control layer to the application layer using the service, an indication to resume generating packets, wherein the indication to resume generating packets comprises an indication that a second value of the quantity of packets or bytes satisfies a second threshold.

16. The method of claim 14, wherein the indication to suspend generating packets comprises an indication that a configured grant (CG) for the UE is deactivated.

17. The method of claim 16, wherein the indication to resume generating packets comprises an indication that the CG is reactivated.

18. The method of claim 10, wherein the flow control layer comprises a radio link control (RLC) layer or a packet data convergence protocol (PDCP) layer.

19. An apparatus for wireless communications at a user equipment (UE), comprising:
means for providing, from a flow control layer of the UE to an application layer of the UE, a capability message comprising an indication that the UE supports a service for providing flow control information from the flow control layer to the application layer for support of extended reality traffic;
means for receiving, from an application of the application layer, a first message registering a flow associated with the application with the service for providing the flow control information;
means for providing, from the flow control layer to the application via the service, an indication that a quantity of packets or bytes in a buffer of the flow control layer associated with the flow fails to satisfy a threshold based at least in part on receiving the first message registering the flow with the service;
means for obtaining, from the application, a packet associated with the flow based at least in part on providing the indication that the quantity of packets or bytes in the buffer fails to satisfy the threshold; and
means for transmitting, to a network entity over a wireless channel, a second message comprising the obtained packet.

20. The apparatus of claim 19, wherein:
providing the indication that the quantity of packets or bytes in the buffer fails to satisfy the threshold comprises an indication to adjust an update rate for generating packets associated with the application layer, and
the packet is obtained from the application layer based at least in part on providing the indication to adjust the update rate for generating packets.

21. The apparatus of claim 20, wherein the indication to adjust the update rate comprises an indication to adjust the update rate to a first value, the apparatus further comprising:

means for providing, from the flow control layer to the application via the service, an indication that the quantity of packets or bytes in the buffer of the flow control layer associated with the flow satisfies a second threshold, wherein the indication that the quantity of packets or bytes in the buffer satisfies the second threshold comprises an indication to adjust the update rate to a second value.

22. The apparatus of claim 21, wherein:

the quantity of packets or bytes failing to satisfy the threshold comprises a first value of the quantity of packets or bytes being greater than the threshold, and the quantity of packets or bytes satisfying the second threshold comprises a second value of the quantity of packets or bytes being less than or equal to the second threshold.

23. The apparatus of claim 19, further comprising:

means for providing, from the flow control layer to the application layer using the service based at least in part on the quantity of the packets in the buffer failing to satisfy the threshold, an indication to suspend generating packets.

24. The apparatus of claim 23, further comprising:

means for providing, from the flow control layer to the application layer using the service, an indication to resume generating packets, wherein the indication to resume generating packets comprises an indication that a second value of the quantity of packets or bytes satisfies a second threshold.

25. A non-transitory computer-readable medium storing code for wireless communications at a user equipment (UE), the code comprising instructions executable by one or more processors to:

provide, from a flow control layer of the UE to an application layer of the UE, a capability message comprising an indication that the UE supports a service for providing flow control information from the flow control layer to the application layer for support of extended reality traffic;

receive, from an application of the application layer, a first message registering a flow associated with the application with the service for providing the flow control information;

provide, from the flow control layer to the application via the service, an indication that a quantity of packets or bytes in a buffer of the flow control layer associated with the flow fails to satisfy a threshold based at least in part on receiving the first message registering the flow with the service;

obtain, from the application, a packet associated with the flow based at least in part on providing the indication that the quantity of packets or bytes in the buffer fails to satisfy the threshold; and transmit, to a network entity over a wireless channel, a second message comprising the obtained packet.

26. The non-transitory computer-readable medium of claim 25, wherein:

providing the indication that the quantity of packets or bytes in the buffer fails to satisfy the threshold comprises an indication to adjust an update rate for generating packets associated with the application layer, and the packet is obtained from the application layer based at least in part on providing the indication to adjust the update rate for generating packets.

27. The non-transitory computer-readable medium of claim 26, wherein the indication to adjust the update rate comprises an indication to adjust the update rate to a first value, and the instructions are further executable by the one or more processors to:

provide, from the flow control layer to the application via the service, an indication that the quantity of packets or bytes in the buffer of the flow control layer associated with the flow satisfies a second threshold, wherein the indication that the quantity of packets or bytes in the buffer satisfies the second threshold comprises an indication to adjust the update rate to a second value.

28. The non-transitory computer-readable medium of claim 27, wherein:

the quantity of packets or bytes failing to satisfy the threshold comprises a first value of the quantity of packets or bytes being greater than the threshold, and the quantity of packets or bytes satisfying the second threshold comprises a second value of the quantity of packets or bytes being less than or equal to the second threshold.

29. The non-transitory computer-readable medium of claim 25, wherein the instructions are further executable by the one or more processors to:

provide, from the flow control layer to the application layer using the service based at least in part on the quantity of the packets in the buffer failing to satisfy the threshold, an indication to suspend generating packets.

30. The non-transitory computer-readable medium of claim 29, wherein the instructions are further executable by the one or more processors to:

provide, from the flow control layer to the application layer using the service, an indication to resume generating packets, wherein the indication to resume generating packets comprises an indication that a second value of the quantity of packets or bytes satisfies a second threshold.

\* \* \* \* \*